(12) United States Patent
Wang et al.

(10) Patent No.: US 12,038,870 B2
(45) Date of Patent: Jul. 16, 2024

(54) SYSTEM AND APPARATUS FOR ON-DEMAND, FEATURE FOCUSED DATA COLLECTION IN AUTONOMOUS VEHICLES AND AUTONOMOUS DRIVING SYSTEMS

(71) Applicant: GM Global Technology Operations LLC, Detroit, MI (US)

(72) Inventors: Shige Wang, Northville, MI (US); Wei Tong, Troy, MI (US); Donald K. Grimm, Utica, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 285 days.

(21) Appl. No.: 17/679,388

(22) Filed: Feb. 24, 2022

(65) Prior Publication Data

US 2023/0264709 A1   Aug. 24, 2023

(51) Int. Cl.
*G06F 16/00*   (2019.01)
*B60W 40/09*   (2012.01)
*B60W 60/00*   (2020.01)
*G06F 16/11*   (2019.01)

(52) U.S. Cl.
CPC ......... *G06F 16/113* (2019.01); *B60W 40/09* (2013.01); *B60W 60/001* (2020.02); *B60W 2420/403* (2013.01); *B60W 2540/30* (2013.01); *B60W 2555/20* (2020.02)

(58) Field of Classification Search
CPC .......... B60W 60/001; B60W 40/09; B60W 2420/403; B60W 2540/30; B60W 2555/20; B60W 2556/45; G06F 16/113
USPC .................................. 707/600–899
See application file for complete search history.

(56) References Cited

U.S. PATENT DOCUMENTS

| | | | |
|---|---|---|---|
| 2019/0143981 A1* | 5/2019 | Naserian | F02N 11/0837 701/55 |
| 2019/0185009 A1* | 6/2019 | Werner | G06N 5/022 |
| 2022/0126864 A1* | 4/2022 | Moustafa | B60W 30/182 |

* cited by examiner

*Primary Examiner* — Michelle N Owyang
*Assistant Examiner* — Shirley D Hicks
(74) *Attorney, Agent, or Firm* — Vivacqua Crane, PLLC

(57) ABSTRACT

An on-demand, feature focused data collection system of an automobile vehicle includes at least one data collection device provided with an automobile vehicle. A data collection unit receives data from the at least one data collection device in response to a data collection request submitted by a user. A data scene group combines portions of the data received by the data collection unit and stored in the data collection unit of the automobile vehicle or at a remote server. A control logic device receives the data collection request and activates collection of the data. The control logic device includes: a data collection strategy which differs if different types of the data are available; a reference algorithm loaded or deployed; a storage capacity allocated for the data; and a storage policy employed to save the data.

13 Claims, 4 Drawing Sheets

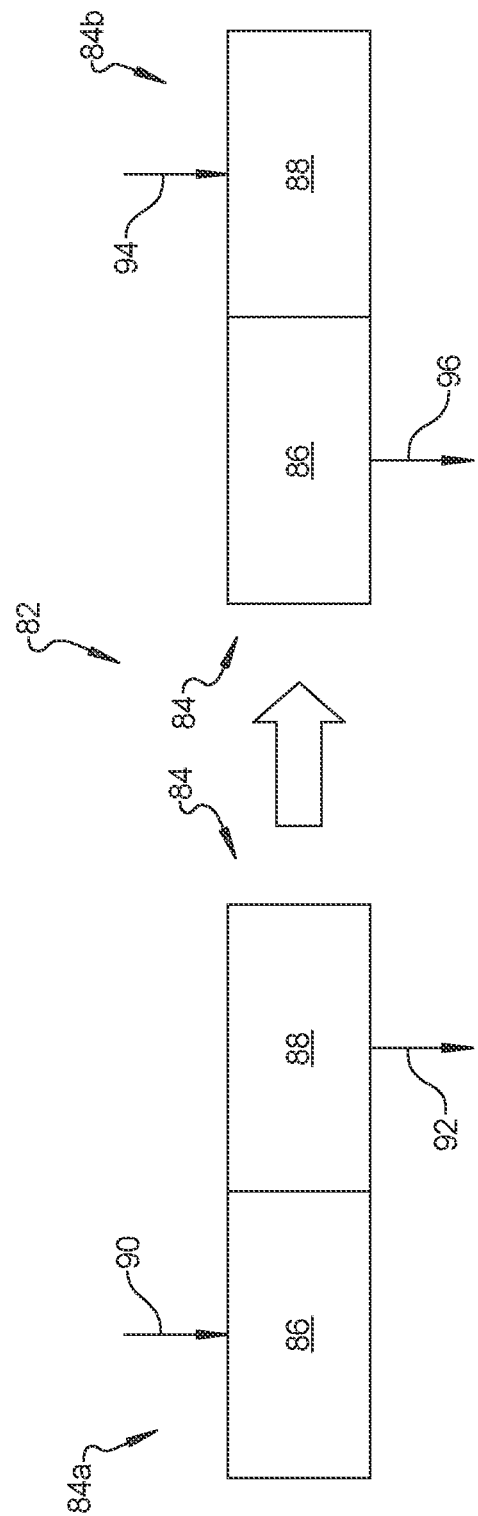

SYSTEM AND APPARATUS FOR ON-DEMAND, FEATURE FOCUSED DATA COLLECTION IN AUTONOMOUS VEHICLES AND AUTONOMOUS DRIVING SYSTEMS

INTRODUCTION

The present disclosure relates to real-world data collection in autonomous vehicles.

Automobile vehicles including autonomous vehicles and systems including autonomous driving systems require voluminous data to support normal operation. Data is necessary for various scenarios that are difficult or impossible to create, or known, during a vehicle design period. These scenarios include operation in varied environmental conditions including rainy weather, snowy weather, icy conditions, high wind, night-driving, city or urban driving and the like. Such vehicles and systems therefore need to collect real-world data for operation.

Vehicle devices may be provided such as radar sensors, laser imaging detecting and imaging (lidar) sensors and camera systems to collect the real-world data. These devices and systems, hereinafter referred to collectively as sensors continuously receive and generate high volumes of data. During a specific operation of the automobile vehicle only a portion of the collected sensor data may be needed. For example, when operating during a rural driving event, fewer other automobile vehicles and few targets such as traffic lights, road signs and roadway intersections are anticipated. Data available and pertinent to operation of the automobile vehicle may therefore be more closely related to real-time conditions such as highway conditions, available light, temperature and the like. When a large database of collected data is accessed to assist driving during these conditions, and when all of the sensor data being collected in real-time must be sorted, much of the data may be irrelevant, and some of the data being currently collected may be superfluous, as the sensors continuously receive data that is repetitive in nature. It is therefore an unnecessary computational burden to continuously evaluate all of the collected sensor data, including all of the sensor data which is collected in real-time.

Thus, while current autonomous vehicle data collection systems achieve their intended purpose, there is a need for a new and improved system to collect, prioritize and use real-time data for autonomous vehicle operation.

SUMMARY

According to several aspects, an on-demand, feature focused data collection system of an automobile vehicle includes at least one data collection device provided with an automobile vehicle. A data collection unit receives data from the at least one data collection device in response to a data collection request submitted by a user. A data scene group combines portions of the data received by the data collection unit and stored in the data collection unit of the automobile vehicle or at a remote server. A control logic device receives the data collection request and activates collection of the data. The control logic device includes: a data collection strategy which may differ if different types of the data are available; a reference algorithm loaded or deployed; a storage capacity allocated for the data; and a storage policy employed to save the data.

In another aspect of the present disclosure, the storage capacity includes a lock-free wait-free storage management feature sized to store the data.

In another aspect of the present disclosure, the lock-free wait-free storage management feature is configured as a modified ping-pong buffer mechanism including two buffers defining a first buffer and a second buffer having the same size with the first buffer and the second buffer, wherein at any time one of the first buffer or the second buffer is flagged for a read function, and the other one of the first buffer or the second buffer is flagged for a write function.

In another aspect of the present disclosure, a logger device is triggered by the control logic device when a predetermined data condition is met.

In another aspect of the present disclosure, the storage capacity includes at least one of a local storage device and a remote storage device located in the remote server; wherein the logger device is responsible to write the data to either the local storage device or to the remote storage device and to manage storage of the data.

In another aspect of the present disclosure, the data collection request defines a predetermined format indicating which of the data to collect and a level of collection.

In another aspect of the present disclosure, the data from the at least one data collection device is collected to a target feature "on-demand" or as requested by a system user including the occupant of the automobile vehicle using strategies including activation conditions, data selection, collection duration, and data storage.

In another aspect of the present disclosure, the data scene group includes multiple data scenes, some or all of multiple data scenes retrieved on-demand from the remote server and returned to the data collection unit via a first remote request forwarded to the remote server via a wireless device which transfers a second remote request to the remote server.

In another aspect of the present disclosure, the data defines at least one of a snow event scene, a night-driving event scene, a rural driving event scene, an urban driving event scene, a vehicle accident event scene, a residential street scene and a highway scene.

In another aspect of the present disclosure, the at least one data collection device includes at least one of a forward-facing camera, a rear-facing camera and a radar or a laser imaging detecting and imaging (lidar) device.

According to several aspects, an on-demand, feature focused data collection system of an automobile vehicle includes at least one data collection device provided with an autonomous automobile vehicle. A data collection unit receives data from the at least one data collection device in response to a data collection request submitted by a user. A control logic device receives the data collection request. An executor of the control logic device executes a reference algorithm to generate a reference output. A comparator of the control logic device compares the reference output to the data from the at least one data collection device. A logger device of the control logic device is triggered when a predetermined data condition is met and activates collection of the data. A lock-free wait-free storage management feature is sized to store the data.

In another aspect of the present disclosure, the control logic device includes a data collection strategy which differs if different types of the data are available.

In another aspect of the present disclosure, a signal generated by the control logic device deactivates data collection according to the data collection strategy.

In another aspect of the present disclosure, a storage policy of the storage management feature is employed to save the data.

In another aspect of the present disclosure, the reference algorithm includes an object detection feature detecting and recognizing objects in a scene in real-time.

In another aspect of the present disclosure, the reference algorithm defines an individually deployable application.

In another aspect of the present disclosure, the reference algorithm has a unique identifier and a structure including inputs required by the unique identifier, types and sizes of the data, output types and output sizes, and an execution environment defining a service, an available memory, and a type and a frequency of a processor of the control logic device, the executor executing the reference algorithm when the inputs and the execution environment are loaded.

According to several aspects, a method to perform on-demand, feature focused data collection for an automobile vehicle comprises: providing at least one data collection device with an automobile vehicle; receiving data from the at least one data collection device in a data collection unit in response to a data collection request submitted by user; combining portions of the data received by the data collection unit as a data scene group and storing the data scene group in one of the data collection unit of the automobile vehicle or at a remote server; transferring the data collection request to a control logic device and activating collection of the data.

In another aspect of the present disclosure, the method further comprises: employing a data collection strategy which differs if different types of the data are available in the control logic device; and applying a reference algorithm to the data after employment of the data collection strategy.

In another aspect of the present disclosure, the method further comprises: allocating a storage device for the data; employing a storage policy to save the data in the storage device; and retrieving the data from the storage device on-demand upon receipt of the data collection request from the user.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 4 is a diagrammatic presentation of a lock-free wait-free storage management feature of the system of FIG. 1.

DETAILED DESCRIPTION

The following description is merely exemplary in nature and is not intended to limit the present disclosure, application, or uses.

Figure 1:
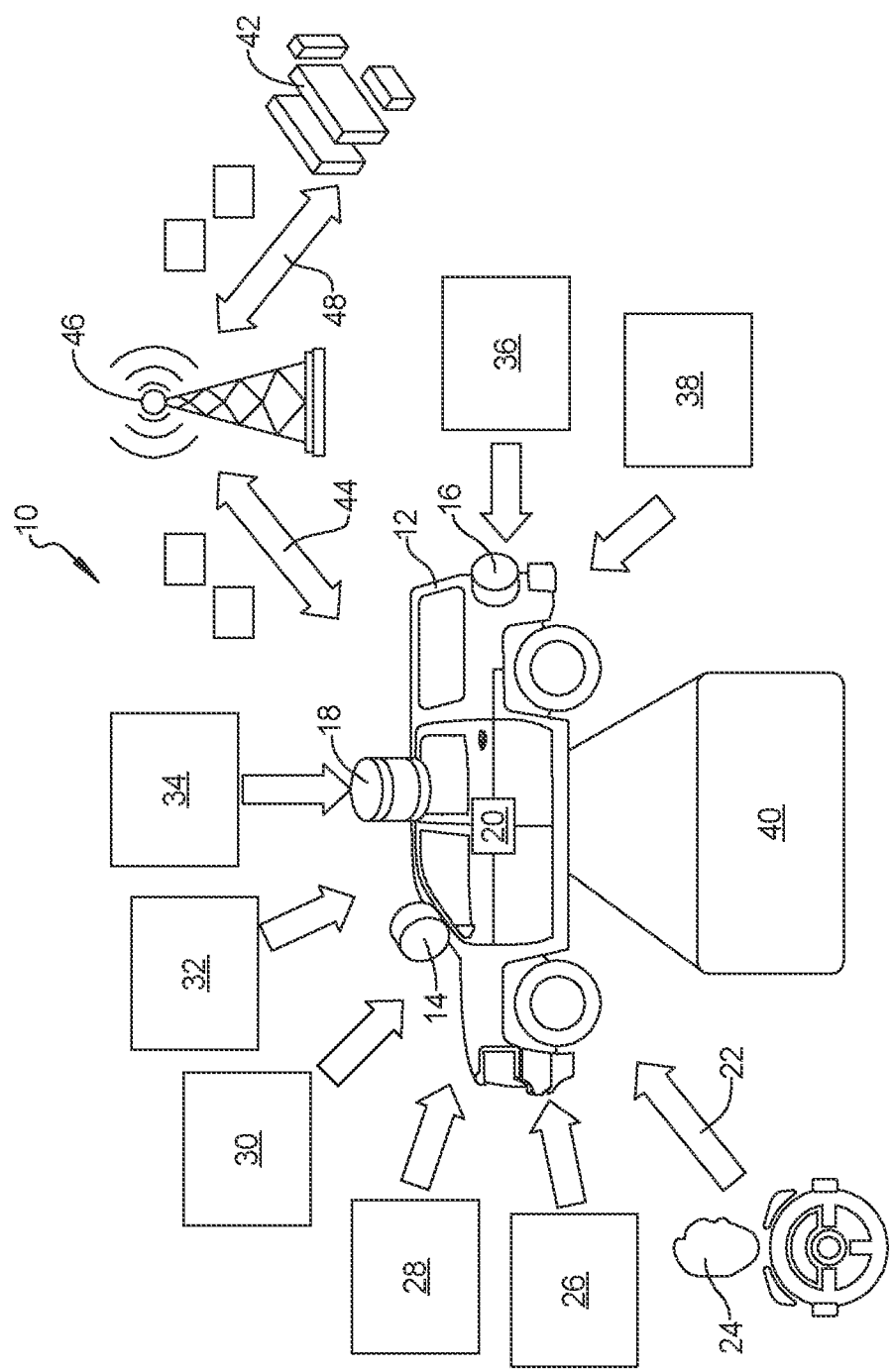
FIG. 1 is a system diagram of an on-demand, feature focused data collection system according to an exemplary aspect.

Referring to FIG. 1, an on-demand, feature focused data collection system 10 is provided for an automobile vehicle 12, which may define an autonomously driven vehicle or an autonomous driving system of a vehicle. The automobile vehicle 12 is provided with at least one and according to several aspects multiple data collection devices, which may include but are not limited to a forward-facing camera 14, a rear-facing camera 16 and a radar or a laser imaging detecting and imaging (lidar) device 18. The multiple data collection devices collect data from multiple sources. A data collection unit 20 receives the data collected by the multiple data collection devices. For example, the data may be received by the data collection unit 20 when a data request 22 is submitted by an occupant 24 of the automobile vehicle 12 such as an operator or a passenger.

The data collected may define and may therefore differ between one or more data scenes, including a snow event scene 26, a night-driving event scene 28, a rural driving event scene 30, an urban driving event scene 32 and a vehicle accident event scene 34. Further examples of data scenes may include non-motion scenes including but not limited to a residential street scene 36 and a highway scene 38. The collected data may be combined in entirety or as portions of the collected data into a data scene group 40 which may be stored in the data collection unit 20 of the automobile vehicle 12 or may be stored at a remote server 42 via a first remote request 44 forwarded to the remote server 42 via a wireless device 46 which transfers a second remote request 48 to the remote server 42. Some or all of the data scenes of the data scene group 40 may be retrieved on-demand from the remote server 42 and returned to the data collection unit 20 using wireless transfer by reversing the second remote request 48 and the first remote request 44.

Referring to FIG. 2 and again to FIG. 1, the on-demand, feature focused data collection system 10 may be implemented as an individual device such as a software component or a controller 50 hereinafter collectively referred to as the controller 50. The controller 50 may be deployed in autonomous driving vehicles or an autonomous driving system equipped automobile vehicle 12 with perception capabilities. As noted above the perception capabilities may include but are not limited to the forward-facing camera 14, the rear-facing camera 16 and the radar or lidar device 18 to collect real-world data for various scenarios that are difficult or impossible to create during an automobile vehicle design phase. The on-demand, feature focused data collection system 10 allows collecting only data relevant to a target feature "on-demand", with on-demand defined as any time that a system user wants or needs something and when requested by the system user which may include the occupant 24 of the automobile vehicle 12. The request may include various strategies including activation conditions, data selection, collection duration, and data storage.

An architecture for on-demand, feature-oriented data collection using the controller 50 takes sensor data including the data scene group 40 from necessary ones of the data collection devices and other vehicle sensors, an output from a feature-of-interest 52 to be collected, and a request for data collection, either from a local user or a remote user. The data collection request such as the data request 22, the first remote request 44 or the second remote request 48 has a predefined format, indicating what data to collect and at how high a level. The collection level may define for example collection at a specific scene, or collection when the feature-of-interest 52 generates a different output compared to a predetermined or a reference algorithm 54.

A control logic device 56 of the controller 50 receives the data request 22, identifies a data collection strategy 58 which may differ between different types of data available, or deploys the reference algorithm 54 according to whether the reference algorithm 54 exists locally already or needs to be retrieved from a remote location such as from the remote server 42, allocates a storage capacity that is adequate for the data collection employing a storage policy 60, and initiates collection of the data. The control logic device 56 continuously monitors collection conditions and triggers data logging using a logger device 62 when a predetermined data condition is met. The logger device 62 is responsible to write the data to either a local storage device 64 or to a remote storage device 66 which may be located in the remote server 42 and to manage the data storage. The invocation and termination of a data collection service is controlled by a request from a higher system level device 68.

Multiple data collection services may exist in the on-demand, feature focused data collection system 10 to collect data for different features. Each data collection service can also be defined to collect data for multiple features. The controller 50 may include the reference algorithm 54, the data collection strategy 58 and the storage policy 60 or these elements may be provided in one or more other controllers.

According to several aspects, a mechanism is applied to define a customizable, feature-specific data collection strategy. The mechanism is built in two parts: 1) a data structure collection request exemplified for example by the data request 22; and 2) a local stored collection strategy such as the data collection strategy 58. A design principle applied by the on-demand, feature focused data collection system 10 uses minimum data carrying for most information.

The data structure collection request includes the following: Request=<req-id, strgy-id, f-list>req-id: indicates the request, where:

Potentially, the service/device can collect data for multiple features.

strgy-id: the configurations of data collection service corresponding to an entry defined in the data collection strategy 58.

f-list: a list of features that the data are collected for.

According to one example: r=<10, {diff, (v-spd, v-loc, f-image, o-list), ref-algo}, {sbda, lca}, local>indicates the request will collect data for the features of a side-blind-zone-alert and a lane-change-alert when both are activated, collect data when a difference between the feature output and the reference algorithm 54 ref-algo occurs, and store the data on a local storage.

Data Collection strategy 58—defines what data are collected, when to collect the data, and how to collect the data.

A set of strategies are defined for one or a set of features, which are predetermined at a vehicle design time. The set of strategies may be stored locally with a data collection service, and may be updated at some designated state, for example when the automobile vehicle 12 is parked. Example features of the collection strategy are defined in a multi-table format shown for example in Table 1 below.

TABLE 1

| Stgy-id | Trigger | Signals | Duration | Reference |
|---|---|---|---|---|
| Feature 1 (FCA) | | | | |
| 1 | Event-brk | Vel, gps, radar | −5 s | |
| 2 | Situation-rain | Gps, vision | 10 s, 10 s repeat | |

TABLE 1-continued

| Stgy-id | Trigger | Signals | Duration | Reference |
|---|---|---|---|---|
| 3 | comparison | Vel, vision | −10 s, 10 s | Ref.algoA (SSD) |
| ... | ... | ... | ... | ... |
| Feature 2 (SBZA + LCA) | | | | |
| 1 | Situation-snow | Vel, gps, radar | −5 s | |
| 2 | comparison | Vel, vision | −10 s, 10 s | Ref.algoA (seg) |
| ... | ... | ... | ... | ... |

Figure 2:
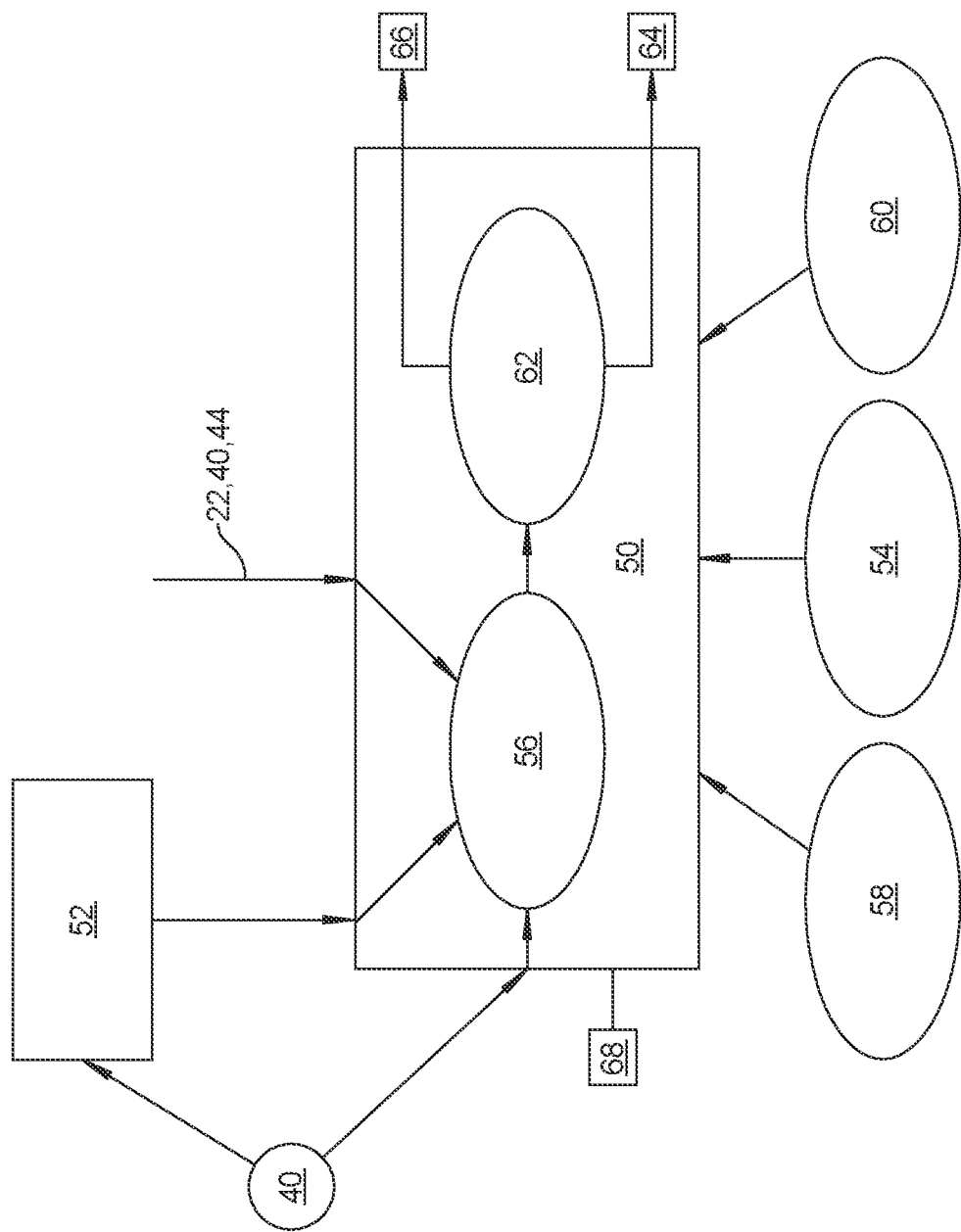
FIG. 2 is a flow diagram identifying features associated with a controller used to operate on data collected for the system of FIG. 1.

Referring to FIG. 3 and again to FIGS. 1 and 2 activation of data collection is based on an activation strategy 70. The activation strategy 70 is implemented in the control logic device 56 shown and described in reference to FIG. 2 that sends an activation signal 72 to trigger a data collection. The control logic device 56 executes the reference algorithm 54, either built in the control logic device 56 or loaded on-demand, which is either stored locally or loaded and subsequently removed. The reference algorithm 54 is executed by an executor 74 in the control logic device 56 and generates a reference output 76. The reference output 76 is compared using a comparator device 78 with an onboard system output 80 generated by a vehicle onboard system, for example one of the scenes of the data scene group 40 for example having a motorcycle, a weather event such as the snow event scene 26, a rain event scene, or defining an interaction during the night-driving event scene 28, and generates the activation signal 72 to activate and deactivate data collection according to the data collection strategy 58.

According to an Example 1: the reference algorithm 54 is defined as a night scene such as the night-driving event scene 28, with the data collection strategy 58 defining a situation, collected every 10 seconds, using a raw image-speed-location-detection. When the onboard system output 80 of the image is night-time and a timer output for collection reaches 10 seconds, the activation signal 72 is generated to trigger a data collection operation.

According to an Example 2: the reference algorithm 54 includes a you-only-look-once (YOLO) object detection algorithm feature that detects and recognizes various objects in a scene in real-time. Object detection in YOLO is performed as a regression analysis problem wherein all objects are detected in a single algorithm run and provides class probabilities of detected scene images. The data collection strategy 58 compares different, raw image onboard-output locations. When the reference algorithm 54 generates detection results different from the onboard system output 80, the activation signal 72 is generated to trigger data collection.

The reference algorithm 54 deployment is a micro-service. Each reference algorithm 54 is implemented as an individually deployable application, wherein any reference algorithm 54 is loaded by the executor 74 when a data collection service starts. The executor 74 in the control logic device 56 is responsible for loading the reference algorithm 54 and ensure it is properly configured. For each reference algorithm 54, its implementation is serialized, stored locally or received from some remote server such as the remote server 42. The reference algorithm 54 is uniquely identified by algo_id, as shown in Table 2 below, and follows a uniform structure. The structure contains: all inputs required by algo_id and their data types and sizes, all outputs generated and their types and sizes, and the execution environments required such as infrastructure services, available memory, type and frequency of processor, and the like.

When all inputs and environment are ready, the executor 74 invokes the executables of the reference algorithm 54.

TABLE 2

| Algo_id → | Input-list: id, type, size |
|---|---|
| | output-list: id, type, size |
| | target environment |
| | executables |

Figure 3:
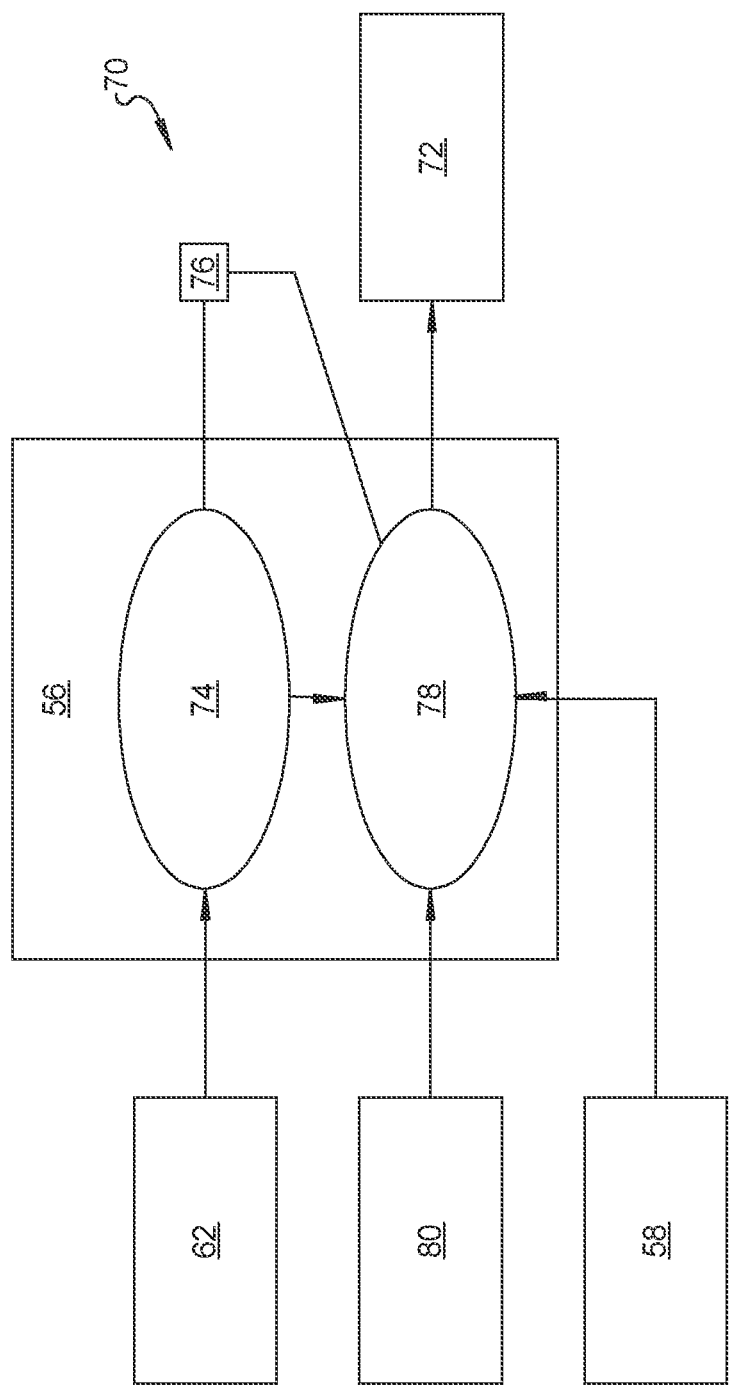
FIG. 3 is a flow diagram of a control logic system portion used for activating data requests for the system of FIG. 1.

Referring to FIG. 4 and again to FIGS. 1 through 3, the collected data as the data scene group 40 defined in reference to FIG. 1 must be consistent and coherent to reflect a real-world situation. Data are stored in one or more buffers in an onboard memory such as the local storage device 64 first, and are written to a persistent storage such as the remote storage device 66 in data blocks. All data are attached with timestamps from a global clock such that the entire system sees the same time at any given moment. To manage the data scene group 40, the on-demand, feature focused data collection system 10 may include a lock-free wait-free storage management feature 82. According to several aspects, the lock-free wait-free storage management feature 82 may be configured as a modified ping-pong buffer mechanism 84 for lock-free and wait-free data logging as this approach avoids data corruption while improve logging.

The modified ping-pong buffer mechanism 84 includes two buffers defining a first buffer 86 having a first buffer size and a second buffer 88 having a second buffer size the same size as the first buffer size and each of the first buffer 86 and the second buffer 88 sized for storing data of all received or needed signals, defined in the collection strategy discussed above with respect to FIG. 3. At any given time, such as a first operation configuration 84*a* there is one buffer, for example the first buffer 86 flagged for a read function 90, and the other buffer, for example the second buffer 88 flagged for a write function 92. A logger such as the logger device 62 stores collected data in the operable read buffer and, in parallel, writes the data into the operable write buffer to the local storage device 64 or to persistent storage such as the remote storage device 66. Upon completion of collecting new data in the read buffer or dumping data into the write buffer, whichever finishes the latest, flags for read and write are switched. Upon switching, a second operation configuration 84*b* provides an opposite one of the buffers, for example the second buffer 88 flagged for a read function 94, and the other buffer, for example the first buffer 86 flagged for a write function 96.

The on-demand, feature focused data collection system 10 of the present disclosure allows flexible configuration of a data collection system to collect any requested data and in different scenarios. The on-demand, feature focused data collection system 10 may be re-targeted to collect different types of data for different features without rebuilding and re-flashing the controller software.

The controller 50 described in reference to FIG. 3 is a non-generalized, electronic control device having a preprogrammed digital computer or processor, memory or non-transitory computer readable medium used to store data such as control logic, software applications, instructions, computer code, data, lookup tables, etc., and a transceiver or input/output ports. The computer readable medium includes any type of medium capable of being accessed by a computer, such as read only memory (ROM), random access memory (RAM), a hard disk drive, a compact disc (CD), a digital video disc (DVD), or any other type of memory. The non-transitory computer readable medium excludes wired, wireless, optical, or other communication links that transport transitory electrical or other signals. The non-transitory computer readable medium includes media where data can be permanently stored and media where data can be stored and later overwritten, such as a rewritable optical disc or an erasable memory device. Computer code includes any type of program code, including source code, object code, and executable code.

The on-demand, feature focused data collection system 10 of the present disclosure can be implemented as an individual device, deployed to an autonomous vehicle (AV) or to advanced driver assistance system (ADAS) vehicles equipped with perception capabilities to collect real-world data for various scenarios that are difficult or impossible to create, sometimes even known, during a vehicle design time. The system of the present disclosure allows on-demand collection of only data relevant to a target feature using various strategies, including activation conditions, data selection, collection duration, and data storage.

An on-demand, feature focused data collection system 10 of the present disclosure offers several advantages. These include a data collection system including on-demand data collection that is triggered by some customizable collection strategies. At least one algorithm-based decision is used to enable collecting only relevant and meaningful data for one or a set of target feature(s). A micro-service based architecture enables on-demand deployment and activation of strategies and algorithms used for data. Continuous data collection is provided with support of lock-free, wait-free storage management.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An on-demand, feature focused data collection system of an autonomous vehicle, comprising:
   at least one data collection device provided with the autonomous vehicle, the at least one data collection device collecting data defining a plurality of different data scenes surrounding the autonomous vehicle; and
   a controller in communication with the at least one data collection device, the controller having a processor and a memory, the memory including instructions such that the processor is programmed to:
   receive the data in a data collection unit;
   combine portions of the data received by the data collection unit as a data scene group and storing the data scene group in the memory;
   receive a data collection request submitted by a user related to a feature, wherein the data collection request includes a predefined format comprising a request identifier, a feature identifier associated with the feature, and a data collection strategy identifier;
   determine a data collection strategy based on the data collection strategy identifier of the data collection request, the data collection strategy defining a data collection trigger event, a data collection type, a data collection duration, and a reference algorithm that defines how to collect the data including inputs required by the reference algorithm, input data types, input data sizes, outputs generated by the reference algorithm, output types, output sizes, and execution environments required to execute the reference algorithm including infrastructure services, available memory, and type of memory; and collect a feature-focused data from the data scene group by executing the data collection strategy, wherein executing the data collection strategy includes:
executing the reference algorithm based on the data collection trigger event;
collecting, using the reference algorithm, the feature-focused data based on the data collection type; and
collecting the feature-focused data over the data collection duration; and operating the autonomous vehicle based at least in part on the feature-focused data, wherein the memory includes a storage capacity allocated for the feature-focused data and a storage policy employed to save the feature-focused data.

2. The system of claim 1, wherein the storage capacity includes a lock-free wait-free storage management feature sized to store the feature-focused data.

3. The system of claim 2, wherein the lock-free wait-free storage management feature is configured as a modified ping-pong buffer mechanism including two buffers defining a first buffer having a first buffer size and a second buffer having a second buffer size being the same size as the first buffer size, wherein at any time one of the first buffer or the second buffer is flagged for a read function, and the other one of the first buffer or the second buffer is flagged for a write function.

4. The system of claim 1, further including a logger device triggered when a predetermined data condition is met.

5. The system of claim 4, wherein the storage capacity includes at least one of a local storage device and a remote storage device located in a remote server, wherein the logger device is responsible to write the data to either the local storage device or to the remote storage device and to manage storage of the data.

6. The system of claim 1, wherein the data scene group includes multiple data scenes, some or all of the multiple data scenes being retrieved on an "on-demand" basis from a remote server and returned to the controller via a first remote request forwarded to the remote server via a wireless device which also transfers a second remote request to the remote server.

7. The system of claim 1, wherein the data defines at least one of a snow event scene, a night-driving event scene, a rural driving event scene, an urban driving event scene, a vehicle accident event scene, a residential street scene and a highway scene.

8. The system of claim 1, wherein the at least one data collection device includes at least one of a forward-facing camera, a rear-facing camera, a radar or a laser imaging detecting and imaging (lidar) device.

9. The system of claim 1, wherein the reference algorithm includes an object detection feature detecting and recognizing objects in a scene in real-time.

10. The system of claim 1, wherein the reference algorithm defines an individually deployable application.

11. A method to perform on-demand, feature focused data collection in an autonomous vehicle related to a feature, the method comprising:

providing at least one data collection device with the autonomous vehicle, the at least one data collection device collecting data defining a plurality of different data scenes surrounding the autonomous vehicle;
receiving the data in a data collection unit;
combining portions of the data received by the data collection unit as a data scene group and storing the data scene group in one of the data collection unit of the autonomous vehicle or at a remote server;
receiving a data collection request submitted by a user related to the feature, wherein the data collection request includes a predefined format comprising a request identifier, a feature identifier associated with the feature, and a data collection strategy identifier; and
determining a data collection strategy based on the data collection strategy identifier of the data collection request, the data collection strategy defining a data collection trigger event, a data collection type, a data collection duration, and a reference algorithm that defines how to collect the data including inputs required by the reference algorithm, input data types, input data sizes, outputs generated by the reference algorithm, output types, output sizes, and the execution environments required to execute the reference algorithm including infrastructure services, available memory, and type of memory;
collecting a feature-focused data from the data scene group by executing the data collection strategy, wherein executing the data collection strategy includes:
executing the reference algorithm based on the data collection trigger event;
collecting, using the reference algorithm, the feature-focused data based on the data collection type; and
collecting the feature-focused data over the data collection duration; and
operating the autonomous vehicle based at least in part on the feature-focused data.

12. The method of claim 11, further including:
allocating a storage device for the feature-focused data;
employing a storage policy to save the feature-focused data in the storage device; and
retrieving the feature-focused data from the storage device on an on-demand basis while operating the autonomous vehicle.

13. A method to perform on-demand, feature focused data collection in an autonomous vehicle related to a feature, the method comprising:

providing at least one data collection device with the autonomous vehicle, the at least one data collection device collecting data defining a plurality of different data scenes surrounding the autonomous vehicle;
receiving the data;
combining portions of the data received by a data collection unit as a data scene group and storing the data scene group in one of the data collection unit of the autonomous vehicle or at a remote server;
receiving a data collection request submitted by a user related to the feature, wherein the data collection request includes a predefined format comprising a request identifier, a feature identifier associated with the feature, and a data collection strategy identifier;
determining a data collection strategy based on the data collection strategy identifier of the data collection request, the data collection strategy defining a data collection trigger event, a data collection type, a data collection duration, and a reference algorithm that defines how to collect the data including inputs required by the reference algorithm, input data types, input data sizes, outputs generated by the reference algorithm, output types, output sizes, and the execution environments required to execute the reference algorithm including infrastructure services, available memory, and type of memory;

retrieving the reference algorithm from the remote server when the reference algorithm is not stored locally in the autonomous vehicle; and collecting a feature-focused data from the data scene group by executing the data collection strategy, wherein executing the data collection strategy includes:
    executing the reference algorithm based on the data collection trigger event;
    collecting, using the reference algorithm, the feature-focused data based on the data collection type; and
    collecting the feature-focused data over the data collection duration; and operating the autonomous vehicle based at least in part on the feature-focused data.

\* \* \* \* \*